United States Patent Office 3,046,231
Patented July 24, 1962

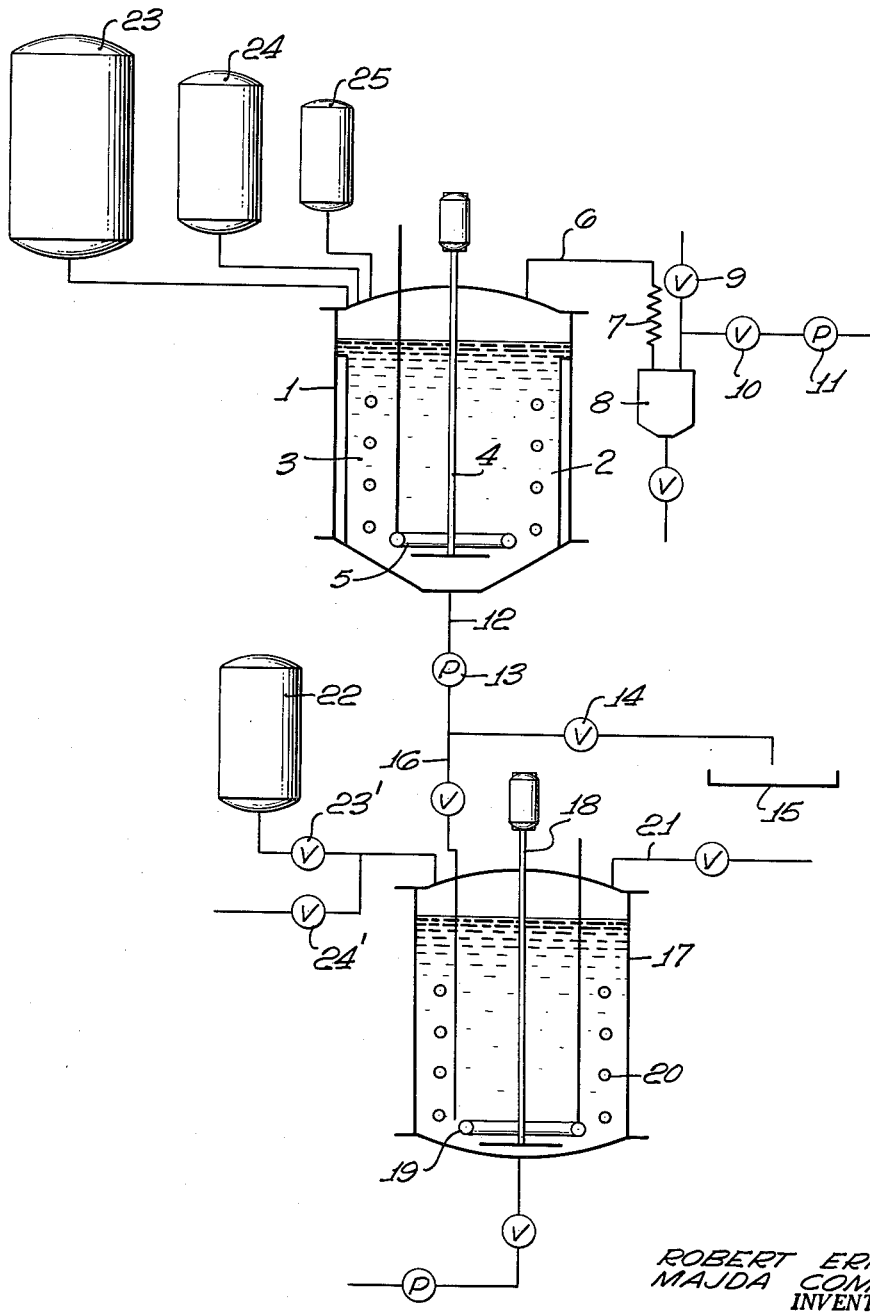

3,046,231
COLOR STABILIZED N-ACYL ALKANE SULFONIC ACID SALTS AND METHODS FOR PRODUCTION OF THE SAME
Robert Ernst and Majda Comar, Los Angeles, Calif., assignors to Textilana Corporation, Hawthorne, Calif., a corporation of California
Filed May 18, 1960, Ser. No. 29,868
15 Claims. (Cl. 252—152)

This invention relates to improvements in the production of acylated amino alkane sulfonic acids and N-substituted amino alkane sulfonic acids, to produce amido surfactants of the anionic surface-active sulfonate type. Fatty amido alkane sulfonic acid salts have been prepared in the past on a large scale by various procedures. One procedure which produces products of this general chemical type is described in U.S. Patent 2,880,219 by L. W. Burnett and M. E. Chiddix, issued March 31, 1959. In this process a taurine salt, particularly N-methyl taurine salt, is reacted with an excess of carboxylic acid at a temperature of 200° to 320° C. in an inert atmosphere. The said patent states that the process may be employed with any one of a number of taurine salts of the general formula

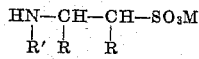

in which R' is selected from the group consisting of hydrogen and hydrocarbon radicals of 1 to 20 carbon atoms, and R is selected from the group of hydrogen and the lower alkyls, and M is a salt-forming radical selected from the group including several salt-formers. The patent lists a number of the 2-amino alkane sulfonic acid salts (taurine salts) and the N-substituted aliphatic, aromatic and alicyclic analogues as suitable.

The patent also states that the taurine salt may be chosen from those having the constitutional formula

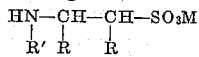

where R is hydrogen, methyl, ethyl, isopropyl and the like, and R' is hydrogen or a hydrocarbon radical of 1 to 20 carbon atoms, and lists the methyl, ethyl, isopropyl, butyl, pentyl, cyclohexyl, heptyl, isooctyl, dodecyl, pentadecyl, oleyl, stearyl, abietinyl, or the like; and M is a salt-forming radical such as an alkali metal or an alkaline earth.

This salt is directly condensed with an acylating agent selected from the carboxylic acids of at least 8 carbon atoms, preferably of the aliphatic, alicyclic carboxylic acids or aromatic carboxylic acids, employing a ratio of at least 1.2 moles of acylating agent to 1 mole of the taurine salt, carrying out the reaction in an inert atmosphere at a temperature of about 200° to 320° C. while removing water formed during the reaction.

The preferred carboxylic acids are, according to the patent, the saturated or unsaturated fatty acids, the resin acids, and mixtures such as are produced from various plant, animal and fish oils, as well as naphthenic acids, abietic acids and mixtures thereof, and hydrogenated derivatives thereof, as well as benzoic acid and alkyl substituents thereof, and the alkyl naphthoic acids.

The amidification reaction scheme is illustrated in the patent by the following:

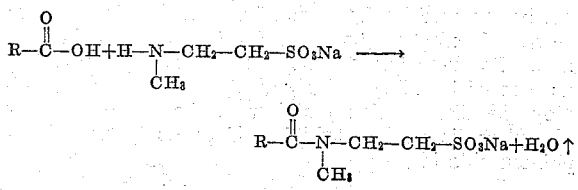

Instead of working in an inert atmosphere, it is suggested by this patent that the reaction may be carried out under vacuum, for example, approximately 15 to 20 mm. of mercury. The resultant product is cooled in the reaction vessel and results, according to the patent, in a tan brittle mass which must be chipped out of the vessel. Instead of allowing the reaction product to solidify in the vessel, the reaction mass may be cooled to about 95° C., and the excess carboxylic acid neutralized in situ to form soaps, employing caustic soda dissolved in small amounts of water. The patent states that N-oleyl-N-methyl taurine is converted into a paste which, upon vacuum drying, results in a yellow solid, which may be ground and pressed into soap bars. While the patent states that the products produced are light in color as compared with the prior art, it is noted in the patent that the products are definitely colored, being tan or yellow, depending on the reactants and the procedure.

Experience with this process shows that the product produced is quite dark in color, being tan or brown. While the color is superior when an inert atmosphere is employed, than is produced when the inert atmosphere is not employed, the reaction mass darkens materially if the mass is removed from the reaction vessel in a molten condition so that it may be handled in the process. Permitting the reaction mass to solidify in the reaction vessel and then chipping it out is an impractical commercial procedure, as is also the neutralization in situ to produce a solid or pasty mass. Neutralizing the free carboxylic acid in the reaction product, for example, by adding sodium hydroxide previously dissolved in a small amount of water, only increases the viscosity and makes the reaction product more difficult to remove from the reactor.

It is better chemical engineering practice to remove the mass in a molten condition and neutralize the solidified reaction product in a separate neutralization zone. However, if this is done, the reaction mass further darkens when the molten mass is cast into suitable frames or containers, and darkens further on standing. The neutralized product is then of definite brown color.

Most of the products having useful acyl groups, ranging from about $C_{10}$ carbon atoms, and those of larger molecular weight, for example, the $C_{10}$ to $C_{18}$ fatty acids, will have to be drained from the reactors at a temperature above about 120° C., for example, 120°–180° C. Contact with air cannot practically be avoided during this draining process, and the drained substance retains its temperature for a considerable length of time, even when cast into relatively thin slabs or onto continuous belts, thus further increasing the discoloration of the product.

Colorless or at least light colored products are demanded for the production of high-quality detergents intended for the consumer market, particularly where these surface-active agents are used in the preparation of toilet goods such as toilet bars, shaving creams and soaps, hair shampoos and various cosmetic creams and lotions, or in the preparation of household detergents, where eye-appeal is also a factor.

We have found that the discoloration or coloration, as the case may be, results from the high-temperature reaction involved in the condensation of the fatty acids with the taurine salts, when the reaction is carried out as described in the patent between the reactants disclosed in the patent, and is aggravated by discharge of the hot melt into suitable containers and, further, upon cooling and storage in atmosphere.

This invention relates to an improvement in the process described in said patent, and has for its purpose the improvement in the color of the products produced by the inter-condensation reaction described in said patent. The disclosure of said patent is herein incorporated by this reference.

We have found that we can produce products of much lighter color, which, on aging, will not darken materially, by incorporating in the reaction mixture, as described in the patent, a discoloration inhibitor which acts to inhibit the generation of color and protects the formed product from color deterioration—that is, from becoming darker on aging. The protective agents or discoloration inhibitors of our invention, employed in the process of our invention, have all pronounced reducing properties. They do not interfere with the reaction completion, and rather have a reaction-promotion effect, so that they may also be described as reducing type catalysts and discoloration inhibitors. It is, however, due to the latter property that their use in the condensation reaction described in said patent and in this application results in products of new utility and improved appearance.

We have found that the organic phosphinic acids which are useful as inhibitors mentioned above have the following structure:

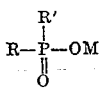

where R is an aliphatic, cycloaliphatic, or aryl radical, and R' represents hydrogen, aryl or aliphatic radical, and M is hydrogen or a salt-forming radical. Typical compounds which may be employed are:

The monosubstituted phosphinic acids may also be written as $R(H)P(O)(OH)$, and the disubstituted products as $RR'P(O)(OH)$. The following phosphinic acids are given as suitable and illustrative of the aliphatic, alicyclic and aromatic, aryl, phosphinic acids and salts thereof (in which the phosphorus is joined to an aliphatic carbon atom of a radical taken from the group consisting of the substituted and unsubstituted aliphatic radical), which may be employed.

Monosubstituted aliphatic phosphinic acids:

Methyl $[CH_3(H)P(O)(OH)]$,
Ethyl $[C_2H_5(H)P(O)(OH)]$,
Propyl or Isopropyl $[C_3H_7(H)P(O)(OH)]$,
Isobutyl $[C_4H_9(H)P(O)(OH)]$,
Isoamyl $(C_5H_{11}(H)P(O)(OH)]$,
Benzyl $[C_6H_5CH_2(H)P(O)(OH)]$, and
Triphenyl methyl $[(C_6H_5)_3C(H)P(O)(OH)]$.

The disubstituted analogues of the above acids and salts may also be employed. These include:

Dimethyl $[(CH_3)_2P(O)(OH)]$,
Diethyl $[(C_2H_5)_2P(O)(OH)]$,
Dipropyl $[(C_3H_7)_2P(O)(OH)]$,
Dibutyl $[(C_4H_9)_2P(O)(OH)]$,
Diisoamyl $[(C_5H_{11})_2P(O)(OH)]$,
Methyl ethyl $[(CH_3)(C_2H_5)P(O)(OH)]$, and
Dibenzyl $[(C_6H_5CH_2)_2P(O)(OH)]$.

Monosubstituted aryl phosphinic acids or salts thereof (in which the phosphorus is joined to the ring carbon chosen from the group consisting of the substituted or unsubstituted aryl radicals), which may be employed, are:

Phenyl $[C_6H_5(H)P(O)(OH)]$,
4-Chlorophenyl $[ClC_6H_5(H)P(O)(OH)]$,
4-Bromophenyl $[4BrC_6H_4(H)P(O)(OH)]$,
Tolyl $[(CH_3)C_6H_4(H)P(O)(OH)]$,
4-Methyl,3-chloro phenyl
    $[4-(CH_3)-3-ClC_6H_3(H)P(O)(OH)]$,
Ethyl phenyl $[(C_2H_5)C_6H_4(H)P(O)(OH)]$,
Xylyl (dimethyl phenyl) $[(CH_3)_2C_6H_3(H)P(O)(OH)]$,
Methyl isopropyl phenyl
    $[(CH_3)(C_3H_7)C_6H_3(H)P(O)(OH)]$,
Isopropyl phenyl $[(C_3H_7)C_6H_4(H)P(O)(OH)]$,
Trimethyl phenyl $[(CH_3)_3C_6H_2(H)P(O)(OH)]$,
Biphenyl $[(C_6H_5C_6H_4)(H)P(O)(OH)]$,
Benzyl phenyl $[(C_6H_5CH_2)C_6H_4(H)P(O)(OH)]$,
Phenyl ethyl phenyl $[(C_6H_5C_2H_4)C_6H_4(H)P(O)(OH)]$, and
Naphthyl $[C_{10}H_7(H)P(O)(OH)]$.

The disubstituted analogues of the above aromatic phosphinic acids and salts, which may also be employed, include:

Diphenyl $[(C_6H_5)_2P(H)(OH)]$,
Dichlorophenyl $[(ClC_6H_4)_2P(O)(OH)]$,
Di(Dichlorophenyl) $[(Cl_2C_6H_3)_2P(O)(OH)]$,
Ditolyl $[(CH_3C_6H_4)_2P(O)(OH)]$,
Diethylphenyl $[(C_2H_5C_6H_4)_2P(O)(OH)]$,
Dipropylphenyl $[(C_3H_7C_6H_4)_2P(O)(OH)]$,
Di(Diethylphenyl) $\{[(C_2H_5)_2C_6H_3]_2P(O)(OH)\}$,
Di(Trimethylphenyl) $\{[(CH_3)_3C_6H_2]_2P(O)(OH)\}$.

Compounds in which the phosphorus is bonded to a carbon taken from each of the foregoing groups of the substituted and unsubstituted radicals, i.e., aromatic and aliphatic groups, where R is aromatic and R' is aliphatic, thus:

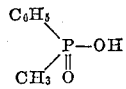

also written herein as $(C_6H_5)(CH_3)P(O)(OH)$, to indicate that both the phenyl and the methyl are joined to the phosphorus. The following phosphinic acids are similarly named and identified by their constitutional formulae:

Phenyl ethyl $[(C_6H_5)(C_2H_5)P(O)(OH)]$,
Phenyl propyl $[(C_6H_5)(C_3H_7)P(O)(OH)]$,
Phenyl isobutyl $[(C_6H_5)(C_4H_9)P(O)(OH)]$,
Phenyl triphenyl methyl $\{(C_6H_5)[(C_6H_5)_3C]P(O)(OH)\}$, and
Phenyl propyl $](C_6H_5)(C_3H_7)P(O)(OH)]$, We may employ the disubstituted phosphinous chloride corresponding to the disubstituted phosphinic acid, where the (OH) group is replaced by a chlorine, as, for example, the disubstituted phosphinous chloride in which the substituent is a substituted or unsubstituted aliphatic, or a substituted or unsubstituted aromatic radical, or both of said radicals; for example:

Dimethyl phosphinous chloride $[(CH_3)_2P(O)Cl]$, and
Methyl ethyl phosphinous chloride
    $[(CH_3)(C_2H_5)P(O)Cl]$, and the following homologues and analogs (that they are phosphinous chlorides will not be repeated):

Diethyl $[(C_2H_5)_2P(O)(Cl)]$,
Dipropyl $[(C_3H_7)_2P(O)(Cl)]$,
Dibutyl $[(C_4H_9)_2P(O)(Cl)]$, and the following aromatic disubstituted phosphinous chlorides:

Diphenyl $[(C_6H_5)_2P(O)(Cl)]$,
Dichlorophenyl $[(ClC_6H_4)_2P(O)(Cl)]$,
Tolyl, phenyl $[(CH_3C_6H_4)(C_6H_5)P(O)(Cl)]$,
Trimethylphenyl,phenyl
    $\{[(CH_3)_3C_6H_2](C_6H_5)P(O)(Cl)\}$,
Ditolyl $[(CH_3C_6H_4)_2P(O)(Cl)]$, and
Dinaphthyl $[(C_{10}H_7)_2P(O)(Cl)]$.

The properties of these compounds are given in standard text books on this subject. Due to the diverse volatility of these materials and their dispersibility in the reaction mixture, depending on the reactants and the reaction conditions, the selection of the above should be made in order that they may be suitably dispersed and not be removed by distillation from the reaction zone or destroyed before they may effectively perform their function. Because of its availability at a reasonable price and its ease of handling and effectiveness, we prefer to employ the discoloration inhibitor in the form of either phenyl or diphenyl phosphinic acid or the diphenyl phosphinous chloride.

Another class of inhibitors which we have found useful are the metallic hydrides, and particularly the metallic borohydrides, such as, for example, the alkali metal borohydrides, such as sodium borohydride, potassium borohydride, and lithium borohydride. Other metallic hydrides and complex hydrides may be used, if stable under the conditions of the reaction.

The alkali metal borohydrides may be used as such or may be used in the process in solution with free alkali metal hydroxide, as, for example, sodium borohydride in caustic soda, a form which is particularly economical to use.

While we do not wish to be bound by any theory of the chemical process by which the above inhibitors are effective, we note that all of the foregoing inhibitors are strong reducing agents. It is believed that impurities created by oxidation, which are present in the raw materials, are reduced, preventing them from creating color bodies. The process may also include reduction to the colorless variety of color bodies created in the process. The process may inhibit the generation of chromophores or the complexing reactions which create color bodies, for instance, by reducing aldehydes present in the carboxylic acids.

While we do not, in view of the incomplete knowledge of the scientific explanation of the effectiveness of our inhibitors, wish to be bound by any theory of their function in our process, as, for example, that it is a reducing action, for the purposes of generic definition we will call them reducing agents or reducing discoloration inhibitors, and it will be understood that the term is used in the context of this disclosure.

The above discoloration inhibitors must be used in sufficient quantity to produce the desired effect. Excessive quantities thereof, on the other hand, will be left in the finished compounds as an impurity and filler. If used in excess of the amount required for its function in the reaction, they load the product with a material which does not add to its function as a surfactant. We have found that quantities of about 0.05% to about 5% constitute a suitable range for the inhibitors indicated, and 0.25% to 2.5% proves a practically useful range, calculated on the total weight of reaction products, i.e., the acyl tauride plus unreacted carboxylic acid. The amount chosen is largely governed by the type and quality of the fatty acids selected in the process, and to some extent on the stability of the taurine salt. The recommended percentages above are based upon the theoretical yield of the finished product (solid basis), i.e., the weight of the N-acyl taurides equivalent to the tauride salt produced, plus the weight of the free, i.e., excess, fatty acid.

The above patent states that aliphatic or alicyclic or aromatic acids of at least 8 carbon atoms, and preferably the higher fatty acids, are operative.

We have found, however, that for the purpose of producing the light colored, substantially odorless surfactants for the uses described above, we wish to use alicylic acids or the saturated or unsaturated fatty acids, which carboxylic acids contain a number of carbon atoms in the range of $C_{10}$ to $C_{18}$ carbon atoms, including also the carbonyl carbon of the carboxylic acid. We may employ mixtures thereof, as such, as are produced from naturally occurring oils of vegetable and animal origin. These include, for example, oleic, linoleic, recinoleic, decanoic, lauric, myristic, palmitic, stearic acid, the alicyclic acids such as abietic acid. The mixed fatty acids produced from coconut oil, i.e., the coconut fatty acids containing primarily lauric and myristic acids, or the similar source of these acids, i.e., the acids produced from palm kernel oil and babassu oil, acids produced from tallow, i.e., tallow acids, and acids produced from soy oil, cottonseed oil, and safflower oil, or such unsaturated oils partially or fully hydrogenated, are preferred.

We also prefer to employ the aliphatic and aromatic taurines selected from the following group, i.e., the 2-N-alkane sulfonic acid salts,

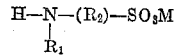

in which $R_1$ is chosen from the group consisting of hydrogen and a hydrocarbon radical of from 1 to about 6 carbon atoms, $R_2$ is an alkane radical of 2 to 8 carbon atoms, and M is a salt-forming radical. Thus, these include the salts of 2-amino-ethyl sulfonic acid, 2-methylamino,ethyl sulfonic acid, and 2-ethyl amino,ethyl sulfonic acid, 2-propyl amino, ethyl sulfonic acid, 2-butyl amino,ethyl sulfonic acid, 2-pentyl amino,ethyl sulfonic acid, 2-hexyl amino,ethyl sulfonic acid, 2-cyclohexylamino, ethyl sulfonic acid, analogues thereof; 2-phenyl amino ethyl sulfonic acid; 2-methyl amino-2-methyl,ethyl sulfonic acid; 2-methyl amino-1-methyl,ethyl sulfonic acid; 2-methyl amino-1-ethyl,ethyl sulfonic acid; and 2-methyl amino-2-ethyl,ethyl sulfonic acid; and 2-methyl amino-1,2-dimethyl,ethyl sulfonic acid.

We prefer to employ the above taurides with our inhibitors to produce the light colored products according to our invention.

A remarkable improvement in the color of the resultant reaction product is achieved by the employment of the discoloration inhibitors discovered above, as described herein, as compared with a like reaction in the absence of such inhibitors, with as good and better a yield than is produced when the reaction is carried out in the absence of such inhibitors. The product produced, when cast into solid form or otherwise solidified and allowed to age for equal times under like conditions, is, by the use of the inhibitors, much lighter in color than is the product produced by a reaction under the same conditions without using the inhibitors.

It has, however, been found that a perceptible darkening occurs in the product produced with the inhibitor when allowed to age; but the product produced without the inhibitor darkens much more than does the product produced using the inhibitor. We have found that the coloration on aging of the product produced with and without the inhibitor can be materially reduced, and in the case of the product when produced with the inhibitor, substantially and entirely prevented, by employing a quenching technique wherein the product is run into water maintained below boiling. Plain water or an alkaline solution may be used. When plain water is used, the product may form as a curd or layer, or unstable dispersion. It separates as a curdal layer, if solid at the temperature of mixing, but which may be dispersed as a coarse mixture with the water to be flushed out with the water, or otherwise removed from the vessel. It may then be dewatered, dried and comminuted.

In the case of an alkaline solution, the product may be formed as a substantially clear or pearly opalescent dispersion, which will be stable. The dispersion is formed by quenching with an alkaline solution. This neutralization of the acids is found also to protect the finished product from developing unpleasant odor.

In producing the stable dispersion by neutralization-quenching, according to our invention, whether or not the reaction has been carried out in the presence of the inhibitor, we prefer to employ the higher saturated or unsaturated fatty acids and the alicyclic acids, which do not contain or contain in minor proportions acids which are of less than 10 carbon atoms or more than 18 carbon atoms. These include the fatty acids derived from the vegetable and animal fats and oils. We prefer not to use the acids derived from marine oils, because of their odor. We may, however, employ the resin acids, for example, those which contain large percentages of abietic acid, so as to come within the above classification. Acids produced from natural oils are mixtures of acids of the above classification and contain impurities of lower and higher molecular weight outside of the above range of carbon atoms. These may be employed if not in excessive quantities, so as to produce acyl groups of too short or too long chains to interfere with surfactant activity, as will be understood by those skilled in the art, or produce reaction products including excess acid, which result in dispersions of such high viscosity as to cause gellation or instability of dispersion. As will be more fully set forth below, the neutralizing conditions and the dilution should be controlled with this point in mind.

Further, when we employ the neutralization-quench to form stable dispersions, we prefer not to employ as the salt-forming radical (M) above, an alkaline earth metal or any polyvalent metal ion, since such ions may interfere with the dispersion and cause gellation. We prefer to employ sodium or potassium, but may use lithium or the water soluble primary, secondary and tertiary amines and alkanol amines. Thus, we may employ primary methyl, ethyl and propyl amines; and secondary amines such as dimethyl, diethyl, dipropyl, methyl ethyl, methyl propyl, ethyl propyl amines; and tertiary amines, for example, trimethyl, triethyl and tripropyl tertiary amines; or tertiary amines using various combinations employing the aforesaid radicals; and the alkanol analogues thereof, as, for example, dialkanol amine, trialkanol amine; such mono-, di- and triethanol amine; or mono-, di- and tripropanol or isopropanol amines; and others of similar basicity, such as have been employed in the past to form fatty acid soaps.

The alkaline solution containing the above neutralizing agent at a temperature below boiling, and preferably at ambient temperature, 90° F. and lower, is contained in a vessel, and the hot molten acyl tauride is discharged from the reactor into the neutralizing vessel with constant agitation during addition. The rate of addition is controlled to keep the temperature of the mixture below boiling, and additional neutralizing agent is added, if necessary, during the mixing to produce the desired final pH. We prefer to continually purge the quench mixture during addition and cooling with an inert gas, such as nitrogen.

The ratio of the water to the dispersed material is controlled in order to produce a dispersion fluid at room temperature. The viscosity of the mixture depends on the molecular weight of the acid employed in the acylating reaction, particularly where it is used in substantial excess, as we prefer, i.e., about 1.5 to 2 moles per mole of the tauride employed.

Thus, when using a saturated acid containing from $C_{16}$ to $C_{18}$ carbon atoms, we prefer to form the dispersion with at least 50% by weight of water, and when using acids of $C_{10}$ to $C_{14}$, inclusive, we may make more concentrated dispersions, i.e., up to about 40% water. The upper limit of the concentration is that at which the solution becomes a gel or becomes excessively viscous, so as to interfere with pouring or pumping. Since the viscosity is a function of temperature, these percentages are illustrative.

As a practical matter, employing alkaline solutions at ambient temperature, we find it desirable to quench with an amount of water or alkaline solution to produce a mixture with not less than about 50% water, in order to produce stable aqueous liquid dispersions, rather than pastes or gels. Further, in order to obtain the required rapid chilling of the hot melt introduced from the reaction vessel, without undue retardation of the rate of addition, it is desirable to employ such quantities of water to provide the heat sink for rapid cooling of the melted N-acyl tauride. Thus, the quantity of water employed should be sufficient in quantity and at a temperature to drop the temperature of the reaction products to below 100° C., and preferably to from ambient to about 80° C., upon dispersion into the quenching liquid in the quenching vessel containing water of the neutralizing solution. This sudden quenching, aided by purging with inert gas during mixing, stabilizes the color, as we have found, to result in solids and aqueous dispersions of lighter and more stable color than is produced without such quenching technique, particularly if no discoloration inhibitor has been employed.

The preferred final pH of the dispersion is 7 to 9, although even higher pH values may be maintained where the end use permits or even requires such higher pH.

The N-acyl tauride-fatty acid mixture may be discharged from the reaction vessel into the water solution of the neutralizing agent, when this is employed, or the water without the neutralizing agent, when this is employed, at reaction temperature without further cooling, by regulating the rate of addition to control the mix temperature to be below boiling. However, it is found more practical to reduce the temperature of the reaction mass somewhat prior to quenching, for instance, to 100° to 180° C. It must, however, be high enough to permit the acyl tauride to flow and disperse readily into the quench liquid in the mixing vessel. The temperature selected is based on the viscosity characteristics of the reaction mixture.

While the dispersion can be kept below the boiling point of water by regulating the rate of addition, the dispersion during formation may be cooled, particularly if it is desired to increase the rate of addition. However, cooling of the dispersion during formation ordinarily will be necessary where ammonia or volatile amines are employed as neutralizers. Analysis of the condensation product prior and after completion of the dispersion process shows that no detectable hydrolysis of the amido alkyl sulfonic acid salt takes place, and the surfactant activity before and after quenching is unchanged.

While we prefer to employ the quenching technique in connection with the use of the color inhibitors in the reaction in order to obtain products of the lightest color, the quenching step in water or alkaline solution is also useful when employed in the process described above, where the color inhibitor is not introduced into the reaction mixture as described above. It thus is useful in connection with the process described in the above Patent 2,880,219. The reaction product may be quenched according to the process of our invention described herein, by discharging the product from the reaction vessel in the process of that patent into an alkaline water in the same way as is described in connection with the process of this invention. This will give a stable liquid aqueous dispersion of the reaction product which is lighter in color and more stable in color than can be obtained by dissolving the product produced according to the process of the above patent, when discharged in liquid form into the atmosphere, as in casting, and then comminuted, or if neutralized in the reaction vessel to form a paste employing just enough water for such purpose.

In like manner, the reaction product produced according to the process of the patent may be quenched by discharging the reaction product from the reaction vessel into water which does not contain a neutralizing agent, according to the process of our invention, as is described above, and the comminuted product produced will be lighter in color than is the product produced according to the process of said patent.

The process will be further described by reference to the drawing, which shows a schematic flow sheet of the process.

The apparatus is of form conventionally employed in chemical engineering processes, and will be well understood by those skilled in the art without further description of the apparatus.

The acylating pressure reactor is equipped with a vapor heating jacket 2, cooling coils 3, turbine agitator 4, and a perforated gas inlet ring 5 connected to a suitable source of nitrogen gas. It is provided with a vapor outlet 6 connected to a condenser 7 and receiver 8, to which a valved atmospheric vent line 9 is connected. It is also connected by valved line 10 to a vacuum pump 11.

The outlet of the reactor is connected through line 12 and pump 13, valved line 14 to the casting molds or other storage 15, or via valved line 16 into the interior of the enclosed vessel 17. Vessel 17 is provided with an agitator 18, gas ring 19 connected to a suitable source of nitrogen gas, cooling and heating coils 20 and a valved vent line 21. The vessel may be charged from vessel 22, containing the alkaline solution, through the valved line 23', or with water via valved line 24'. Of course, the alkaline solution may be made up in the tank 17 by introducing water through line 24' and concentrated base from 22.

Usual pumps, valving sampling outlet, other plumbing and instrumentation are omitted from the flow sheet, and will be understood by those skilled in this art to be employed, according to good chemical engineering practice.

The liquid or liquified acid contained in vessel 23 is introduced into the reactor 1. The discoloration inhibitor described above, contained in vessel or hopper 25, is added and dispersed in the carboxylic acid and heated, while purging with nitrogen, to an elevated temperature but below the reaction temperature, that is, substantially below about 200° C., and preferably below 150° C., in order to minimize the loss of the acids due to steam distillation resulting from the boiling off of the water, when subsequently adding the taurine salt from vessel 24 in the form of an aqueous solution.

The taurine salt solution, when used as a water solution, is added to the acid in the reactor after dispersion of the inhibitor. We have found that a material improvement in the process conditions results by adding the taurine salt solution under a partial vacuum, employing the vacuum pump 11, for example, from about 400 to 100 mm. of Hg, while maintaining the temperature of from about 80° to 180° C. This is further assisted by continuously purging the reaction with an inert gas, for example, nitrogen, introduced via ring 5. Upon completion of the addition of the taurine salt and removal of most of the water brought in by the taurine salt solution, the vacuum may be discontinued by closing valve 10 and continuing the introduction of nitrogen through 5 until atmospheric pressure is established by vessel 1, and then opening the vent line 9 to the atmosphere. The temperature is raised by passing hot vapor or fluid through jacket 2, generally to about 200° to 220° C. Slightly higher temperatures, such as, for example, 240° C., can be tolerated, but are not necessary. At the higher temperature, above about 240° C., the hazards of color formation and color forming products are increased. During the entire process an inert gas, such as nitrogen, is passed through the reaction mass via ring 5. This also speeds up the process of condensation by prompt removal of water of condensation. Upon completion of the condensation reaction, the product produced may then be partially cooled by passing cooling fluid through coils 3, while still purging with nitrogen, and then, while still liquid, may be cast into molds of desired shape, by passing it through valved line 14 into the molds 15, open to atmosphere.

Instead of casting the product from the reaction vessel, we prefer to run the partially cooled reaction mixture into the quenching vessel 17, which may contain water only or alkaline solution. The mixing is carried out while purging with nitrogen or other inert gas through ring 19. The rate of addition of the hot melt is such as to maintain the temperature below boiling and preferably in the region below about 80° C. The mixture, when completed with water only, while still agitated, is discharged as a slurry from the mixer 17 to suitable separating equipment, not shown. We prefer, however, to employ an alkaline reagent to form a stable dispersion in the mixer 17. The alkaline solution, for example, caustic soda, is contained in 17. The molten product from 1 is pumped via line 16 into the quenching vessel 17, while agitated by the mixer, and with gas passing through 19. The addition of the hot melt is at a rate to maintain the temperature in 17 below boiling, and preferably below about 80° C., adding additional caustic solution from 22 or some other source to maintain the pH in the mixture in 17 in the region of about 7 to 9. This produces a homogeneous dispersion of the N-acyl tauride and saponified excess fatty acid.

The following examples illustrate the process of our invention.

*Example 1*

6,400 parts by weight of molten hydrogenated coconut fatty acids is introduced into the reactor 1.

The fatty acid is heated to a temperature of about 105° C. to 125° C. and agitated in the reactor, while purging with nitrogen. 84 parts by weight of phenylphosphinic acid is introduced into the liquid, while constantly agitating and purging with nitrogen. The reactor is now evacuated and brought to a vacuum of about 20 to 23 inches of water, continuing the purging with nitrogen. We prefer to employ a molar excess of taurine salt. Thus, we prefer to use about 1.5 to 2 moles per mole of taurine. 3,528 parts (about 2 moles of acid to 1 mole of taurine salt) by weight of a warm solution (40° C.–90° C.) containing 58.6% by weight of the N-methyl ethyl sulfonic acid, as the sodium salt, is added to the acid in the evacuated reactor, while purging.

The temperature of the mixture at the start of addition of the taurine salt is, for example, about 125° C. The addition is made, for example, over a period of about 2 hours, the addition being controlled to control the foaming while agitating and purging. The temperature during the addition is gradually raised from about 125° C. to about 140° C. After addition, the reactor is then heated, gradually raising the temperature from 140° C. to 180° C. over a period of about three hours, continuing the agitation and purging. The vacuum is then cut off, and the reaction in the vessel is heated under atmospheric pressure with continued agitation and nitrogen purging, raising the temperature gradually, for example, to 220° C. over a period of about 6 hours. The temperature is maintained until tests on samples indicate completion of the acylation of taurine salt. The heating is now discontinued, and the mass discharged by pumping when the temperature gradually drops, for example, from 220° C. to 170° C.–160° C. during pumping. A process carried out according to the above scheme, when sampled, showed 94% conversion based upon the taurine salt (sodium-N-methyl ethyl sulfonate) employed, employing the methylene blue test. See S. R. Epstein Trans. Faraday Society, Vol. 44, 226–230 (1948). However, employing Hyamine 1622 (p-diisobutyl ethyl dimethyl ammonium chloride) as the cationic standard solution in carrying out the titration.

*Example 2*

The product produced at the end of the reaction of Example 1, at the temperature of about 170° C., can be discharged into a vessel 17 containing 10,842 parts by weight of water, containing 914 parts of a 50% caustic soda solution. The liquid is run into the now dilute caustic soda solution at a rate to prevent foaming over, constant purging with nitrogen continued during the mixing, and the mixture agitated continuously to form a uniform dispersion. The pH value of the mixture is held within the region of about 8 to 8.5, adjusting the pH by the addition of additional caustic soda solution, or starting fatty acid (hydrogenated coconut fatty acid).

Following the above procedure, a final dispersion containing about 42% to 43% of solids was made. It had a viscosity of 160 centipoises measured at 24° C. on a Brookfield Synchro-Lectric viscosimeter with a No. 2 spindle rotating at 20 r.p.m. The mass was a fine, stable, pearly opalescent dispersion of the fatty acid amide of the N-methyl ethyl sulfonic acid sodium salt and the sodium salt of hydrogenated coconut fatty acid. The temperature during the quenching was held in the region of about 40° C. to 80° C. and below boiling.

The effectiveness of the various discoloration inhibitors described above will appear from the following examples, in which the reaction is carried out with and without the color inhibitors of our invention. In each of the following examples, 3–23, the molten acylating agent, which was in each case a fatty acid in the range of $C_{10}$ to $C_{18}$, was introduced into a laboratory resin reactor equipped with a vacuum-tight stirring apparatus, thermometer, insulated dropping funnel, Claisen distilling head, connected to a distillate collector, and a vacuum pump, and equipped with a tube for injection of nitrogen into the reaction mixture. The reactor was heated to about 100° C. with an electrical heating mantle, and the inhibitor added, while agitating and mildly purging with nitrogen during the addition and heating. Vacuum is then applied, reducing the pressure inside the reactor to about 150 mm. of Hg, and the tauride salt, N-methyl taurine sodium salt $$(CH_3NHCH_2CH_2SO_3Na)$$

in the form of an aqueous solution, except in Examples 13, 14 and 15, was added gradually over a period of one or two hours. Where, in the following examples, the solution or dry tauride salt is reported as percent active, it is the weight percent of the taurine acid equivalent to the weight percent of the salt present in the solution, taken as 100%, or dry powder, taken as 100%, as determined by potentiometric titration to determine the amine equivalent. The addition and temperature were regulated to prevent excessive foaming and excessive viscosity development.

When the addition of the taurine salt was completed and the temperature reached about 180° C., at which point most of the water brought in with the taurine salt was removed, the vacuum was turned off. The reaction mass was then heated under atmospheric conditions to a temperature of about 210° C. to 220° C. and maintained while purging at this temperature for an additional period of time, until substantially complete conversion of the tauride salt occurred, about 8 hours.

A portion of the liquid product was discharged from the reaction vessel into shallow trays and allowed to cool. After aging for the same period of time in each example, two weeks, it was broken up. It was dissolved into an equal weight of solvent composed of equal weights of distilled water and isopropyl alcohol, to give a solution containing 50% by weight of solids.

The color of the solution was determined on a Klett-Summerson photoelectric colorimeter. Two filters were used, one green No. 54 having transmission limits of 500–570 millimicrons, and a blue filter No. 42 having transmission limits of 400–450 millimicrons. The Klett-Summerson photoelectric colorimeter is sold by Klett Manufacturing Company of New York. It is a colorimeter in which the transmission of light of selected frequency is determined. In the tests herein reported, the percent transmission of light through the blue filter (spectral range 400–564 millimicrons) and in the green filter (spectral range 500–570 millimicrons) is determined by photoelectric means. The spectral range for visible light is about 4000 to 7000 Ångstroms, that is, about 400 to 700 millimicrons. In this apparatus, a colorless solution will give 100 percent transmission through both filters, and the darker the color the lower is the percent transmission. When using the blue filter, the instrument measures the absorption (and therefore the percent transmission) of color bodies in the red, orange, yellow, green and blue region of the visible spectrum; and when using the green filter, it measures the absorption (and therefore the percent transmission) of color bodies in the red, yellow, purple, orange and blue region. Since the percent transmission is directly proportional to the concentration of color bodies (Beer's Law), the relative percent transmission as between two samples of solution of like total concentration of solids is proportional to the relative concentration of the color bodies in the sample. It is noted that, in making these experiments, the thickness of the cell into which the solution is placed and the weight concentration is in each case the same.

*Example 3*

The process described above was carried out, employing 2 moles of acylating agent, i.e., 551.8 grams of hydrogenated bottoms of coconut fatty acid, having an acid number of 203.3, a saponification number of 203, an iodine value of 5, and a titre of 54° C. Gas chromatographic analysis of the acids gave the following results:

| Acids | By weight percent |
|---|---|
| $C_{10}$ | 0.1 |
| $C_{12}$ | 3 |
| $C_{14}$ | 6 |
| $C_{16}$ | 40 |
| $C_{18}$ | 50.9 |

No color inhibitor is employed in this example. The N-methyl taurine salt solution, i.e., the sodium salt of the N-methyl ethyl sulfonic acid, contained 31.9% actives, and was added over a period of two hours. The total amount taurine salt was 435.7 grams, equalling a ratio of two moles of fatty acid to one mole of the taurine salt.

The colorimeter values of the product produced showed a percent transmittance, using the green filter, of 83.6%; and a percent transmittance using the blue filter of 49.4%.

*Example 4*

The process of Example 3 is followed exactly, except that there is added to the acid, according to the method described above, 3.5 grams of phenylphosphinic acid (0.5%). The percent transmission of the product, using the green filter, was 88.1%; and when measured through the blue filter 71.4%.

*Example 5*

Example 5 was carried out the same way as Example 4, except that, instead of 3.5 grams of phenylphosphinic acid, 6.9 grams of phenylphosphinic acid was employed (1%). The product had a transmission value, using the green filter, of 85.1%; and through the blue filter of 72.4%.

*Example 6*

The same process was carried out employing 2 moles (442.0 grams) of coconut fatty acids, having an acid number of 253.9, an equivalent weight of 221, an iodine value of about 11, a titre of 26° C., and an initial color, using a Lovobond cell, of 2.5R–25Y, 5¼" column. No color inhibitor was employed. One mole (435.7 grams) of N-methyl tauride, in the same concentration as in Examples 3–5, was employed.

The product, when dissolved in the solvent as previously described, showed, employing the green filter, a percent transmittance of 70%; and through the blue filter a percent transmittance of 31.7%.

*Example 7*

The process of Example 6 was carried out, except that there was added, as described above, 2.9 grams of phenylphosphinic acid (0.5%). The solution of the product in the solvent, as described above, showed, employing the green filter, a percent transmittance of 78.2%; and when employing the blue filter, 51.3%.

*Example 8*

The process of Example 7 was repeated, employing, however, 1% of phenylphosphinic acid, i.e., a total of 5.9 grams. The product, when dissolved in the solvent as described above and tested as previously described, employing the green filter, the percent transmittance was 77.8%; and employing the blue filter. 60.1%.

Example 9

The process as described above was carried out, employing 2 moles (560.2 grams) of crude tallow fatty acid, having an acid number of 200.3, an equivalent weight of 280.1, as saponification number of 206, iodine value of 56, titre 41° C. and initial color using the Lovibond cell of 35Y–10R, 5¼". One mol of the tauride was used in solution in the concentration employed in the previous examples. No color inhibitor was employed. The product produced, when dissolved in the solvent and tested as previously described, employing the green filter, the percent transmittance was 69%; and with the blue filter 23.7%.

Example 10

The procedure in Example 9 was followed, employing, however, 3.5 grams phenylphosphinic acid (0.5%). The product produced, when tested employing the green filter, showed a percent transmittance of 78.2%; and employing the blue filter 39.1%.

Example 11

The process of Example 10 was followed employing, however, 7 grams of phenylphosphinic acid (1%). The product produced, when tested as previously described employing the green filter, showed a percent transmittance of 84.5% and a percent transmittance employing the blue filter of 53%.

Example 12

The process of Example 11 was carried out employing 1% of diphenylphosphinous chloride, in place of the phenylphosphinic acid, added as described above and at the point of process described above. The product produced tested as previously described, employing the green filter, showed a percent transmittance of 83.2%; and when employing the blue filter showed a percent transmittance of 42.3%.

Example 13

The process was carried out employing 1.5 moles (412.5 grams) tallow fatty acid (refined) having an acid number of 204 and equivalent weight of 275, saponification value of 205, and iodine value of 51, and a titre of 42.5 C., and Gardner color 3. The fatty acid in the reactor was mixed with 1 mole (191.7 grams) of a substantially dry N-methyl tauride, 72.5% active. In this procedure the dry material was added after the acid was brought to the molten condition, purging continuing during the addition. No vacuum was applied in this example. No inhibitor was employed in the reaction. The product, when tested according to the procedure described above, employing the green filter showed a percent transmittance of 63%; through the blue filter 15.7%.

Example 14

The same process of Example 13 was carried out, adding, however, 11.1 grams of phenyl phosphinic acid (2%), prior to the addition of the tauride. The product produced, when tested through the green filter and according to the method described above, showed a percent transmittance of 79.4%; and through the blue filter 52%.

Example 15

The same process of Example 14 was carried out, employing, however, 2.8 grams of phenylphosphinic acid (0.5%). The product produced, when tested as previously described, when employing the green filter showed a percent transmittance of 74%; and through the blue filter 28.7%.

Example 16

The process of Example 13, except that 1.5 moles of fatty acid (412.5 grams), per mole of tauride, containing 59.39% active, was employed. As in Example 13, no inhibitor was employed. The percent transmittance through the green filter, by the above test, was 57%; and through the blue filter 7.5%.

Example 17

The process of Example 14 was carried out, employing the same materials, except that there was added 11.1 grams of phenylphosphinic acid (2%). The product produced showed a percent transmittance, employing the green filter, of 85.9%; and through the blue filter 53.9%.

Example 18

The process of Example 17 was carried out, using 2.8 grams of phenylphosphinic acid (0.5%). The product produced showed a percent transmittance, employing the green filter, of 78.7%, and employing the blue filter 36.6%.

Example 19

The process as described above was carried out using 2 moles (405.2 grams) lauric acid, having an acid number of 276.9, equivalent weight of 202.6, containing about 92% of lauric acid and 8% of myristic acid, employing 5.5 grams of phenylphosphinic acid (1%) and 1 mole (248.2 grams) of the tauride in water solution (56% actives). The product produced, when tested according to the procedure previously described, showed a percent transmittance using the green filter of 88.5%; and when employing the blue filter of 66.9%.

Example 20

The process of Example 19 was carried out, employing instead of the phenylphosphinic acid, 5.5 grams of diphenylphosphinous chloride (1%). The product produced, when tested according to the procedure previously described, showed a percent transmittance of 92% employing the green filter; and when employing the blue filter of 68.9%.

Example 21

The process of Example 20 was carried out employing, instead of the phenylphosphinous chloride, 5.5 grams of sodium borohydride (1%). The product produced had a percent transmittance, employing the green filter, of 87.9%; and employing the blue filter of 63.7%.

Example 22

The process of Example 19 was carried out, employing a mixture of 50% by weight of the acid of Example 19 and 50% by weight of the acid of Example 13, and tauride solution containing 59.39% actives employed in the aforementioned examples, being in a ratio of 2 moles of acid to 1 mole of the tauride salt, and employing the amount of phenylphosphinic acid employed in Example 19 (1%). The product produced, when tested through the green filter as previously described, showed a percent transmittance of 90.4%; and through the blue filter of 69.7%.

Example 23

The process of Example 22 was carried out employing as the acid a mixture composed of 30% of the acid employed in Example 19 and 70% of the acid employed in Example 13, employing the same ratio of 2 moles of the acid to 1 mole of the tauride salt in a solution containing 59.39% active. The phenylphosphinic acid was employed in the same ratio as was employed in Example 22. The product produced was tested according to the procedure previously described, and employing the green filter showed a percent transmittance of 90.4%; and through the blue filter of 68.2%.

The following table tabulates the results obtained and illustrates the improvement obtained by the use of the inhibitors in the process of our invention.

| Example | Acylating Agent | Mol. Ratio Acylating Agent to Tauride | Tauride, Percent Active | Percent Inhibitor | Transmission | |
|---|---|---|---|---|---|---|
| | | | | | Green | Blue |
| 3 | Hyd. Coconut fatty acids | 2:1 | 31.9 | None | 83.6 | 49.4 |
| 4 | do | 2:1 | 31.9 | 0.5 | 88.1 | 71.4 |
| 5 | do | 2:1 | 31.9 | 1.0 | 85.1 | 72.4 |
| 6 | Coconut fatty acids | 2:1 | 31.9 | None | 70.0 | 31.7 |
| 7 | do | 2:1 | 31.9 | 0.5 | 78.2 | 53.1 |
| 8 | do | 2:1 | 31.9 | 1.0 | 77.8 | 60.1 |
| 9 | Crude tallow fatty acids | 2:1 | 31.9 | None | 69.0 | 23.7 |
| 10 | do | 2:1 | 31.9 | 0.5 | 78.2 | 39.1 |
| 11 | do | 2:1 | 31.9 | 1.0 | 84.5 | 53.0 |
| 12 | do | 2:1 | 31.9 | [1] 1.0 | 83.2 | 42.3 |
| 13 | Refined tallow fatty acids | 1.5:1 | 72.5 | None | 63.0 | 13.7 |
| 14 | do | 1.5:1 | 72.5 | 2.0 | 79.4 | 52.0 |
| 15 | do | 1.5:1 | 72.5 | 0.5 | 74.0 | 28.7 |
| 16 | do | 1.5:1 | 59.39 | None | 57 | 7.5 |
| 17 | do | 1.5:1 | 59.39 | 2.0 | 85.9 | 53.9 |
| 18 | do | 1.5:1 | 59.39 | 0.5 | 78.7 | 36.6 |
| 19 | Lauric acid | 2:1 | 56.0 | 1.0 | 88.5 | 67.9 |
| 20 | do | 2:1 | 56.0 | [1] 1.0 | 92.0 | 68.9 |
| 21 | do | 2:1 | 56.0 | [2] 1.0 | 87.9 | 63.7 |
| 22 | 50% Lauric, 50% tallow fatty acids. | 2:1 | 59.30 | 1.0 | 90.4 | 69.7 |
| 23 | 30% Lauric, 70% tallow fatty acids. | 2:1 | 59.39 | 1.0 | 90.4 | 68.2 |

As inhibitor:
[1] Diphenylphosphinous chloride.
[2] Sodium borohydride.
All other examples—Phenylphosphinic acid.

*Example 24*

A portion of the product prepared according to Example 20, while still in the molten state, was discharged from the reactor into a vessel containing 823 grams of soft water, containing 123 grams of triethanolamine. 500 grams of Lauroyl-N-methyl tauride was introduced through a heated dropping funnel, which was blanketed with nitrogen, into a 3-necked 2000 ml. flask, containing alkaline solution and equipped with a thermometer and nitrogen gas inlet tube, and while purging with nitrogen during the addition. The addition was complete in 15 minutes, and the temperature in the quenching vessel never exceeded 60° C. A smooth dispersion was instantly formed and showed the following properties upon cooling. Total solids content, 44.1%; pH at 24° C.—7.7; viscosity at 24° C.—268 cps., Brookfield Synchro-Lectric viscosimeter, Spingle No. 2/20 r.p.m. The solution was virtually colorless. Upon standing, it showed some pearlescence.

*Example 25*

A like dispersion was attempted, using the same ingredients but employing 415 grams of water to give 60% solids. The dispersion turned into stiff gel and solidified, so that the stirring had to be stopped. This solid mass could not be drained from the quenching vessel.

*Example 26*

Another sample produced according to Example 20 was introduced into a like vessel containing 773 grams of distilled water and 97 grams of a 50% solution of KOH, to which was added, over a period of 10 minutes, at 165° C., 510 grams of the lauroyl-N-methyl tauride produced according to Example 20. The top temperature recorded did not exceed 60° C. A low viscosity and nearly colorless solution resulted, having the following properties: Total solids—39.5%; pH at 24° C.—8.6; viscosity at 24° C.—124 cps.; Brookfield Synchro-Lectric viscosimeter, Spindle No. 2/20 r.p.m.

*Example 27*

The process of Example 26 was repeated with another sample produced according to Example 20, employing, however, enough water to produce a solution containing 60% by weight of solids. The product was a gel and could not properly be managed in the reactor.

*Example 28*

The process of Example 26 was repeated, using enough water to produce a solution containing 50% solids. This solution had to be heated to render the same in a fluid condition.

Employing the lauroyl-N-methyl tauride, we conclude that the 50% solids solution is the practical maximum limit to produce the dispersion in the caustic potash to produce the desired result. The dispersion will be of suitable viscosity and is pumpable and pourable without heating.

*Example 29*

The product of Example 3, removed from the reactor, introduced into a vessel containing tap water. The rate of addition was controlled to maintain the temperature of water below 70° C., while agitating and purging with nitrogen. The total amount of reaction product added equalled ⅔ of the weight of water used. The product congealed into a curdal dispersion which accumulated at the surface and was readily separated and dried into a waxy solid which could be ground to a powder.

*Example 30*

The procedure of Example 29 may be carried out with product of Example 4, with like result.

While we have described particular embodiments of our invention, it should be understood that various modifications and adaptations thereof may be made within the spirit of the invention, as set forth in the appended claims.

We claim:

1. A process comprising heating, in an acylating stage, an acylating agent selected from the group consisting of the aliphatic and alicyclic carboxylic acids of about 10 to about 18 carbon atoms, with a taurine salt of the formula

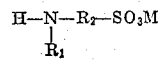

wherein $R_1$ is chosen from the group consisting of hydrogen and a hydrocarbon radical of about 1 to about 6 carbon atoms, and $R_2$ is chosen from the group consisting of hydrocarbon radicals of about 2 to about 8 carbon atoms, from about 0.5% to about 5%, calculated on the weight of the acylated tauride and excess carboxylic acid in the reaction product, of a discoloration inhibitor chosen from the group consisting of the organic phosphinic acids and the M salts of said phosphinic acids, organic phosphinous chlorides, and the alkali metal borohydrides, where M above is a salt-forming radical chosen from the group consisting of alkali metals, alkaline earth metals, and water soluble lower alkylamines and lower alkanolamines, in an inert atmosphere at a temperature of about 200° C. to 320° C., while removing water formed during the reaction, employing a mole ratio of at least 1.2 moles of acylating agent to one mole of taurine salt, and producing an acylated tauride mixed with an unreacted acylating agent.

2. The process of claim 1, and thereafter withdrawing the reaction product from said acylating zone into a mixing zone and mixing the reaction product produced in said mixing zone with water, the quantity of water being sufficient to quench said reaction product, and the ratio of the quantity of water to the quantity of said product, and the temperature of said water and the rate of addition of said product to said water forming a non-gelled pumpable mixture at a temperature below the boiling point of water.

3. The process of claim 1, in which the taurine salt is the alkali metal salt of N-methyl ethyl sulfonic acid.

4. The process of claim 1, in which the discoloration inhibitor is phenyl phosphinic acid.

5. The process of claim 1, in which the discoloration inhibitor is sodium borohydride.

6. The process of claim 2, wherein said water is an alkaline solution containing a base chosen from the group consisting of the alkali metal hydroxides and the water-soluble amines, and forming a stable dispersion of said acylated tauride at a pH of at least 7, and in which said salt forming radical is an alkali metal.

7. The process of claim 3 and thereafter withdrawing the reaction product from the acylating zone and mixing the reaction product with water, the quantity of water being sufficient to quench said reaction product, and the ratio of the quantity of water to the quantity of said product, and the temperature of said water and the rate of addition of said product to said water forming a non-gelled pumpable mixture at a temperature below the boiling point of water.

8. The process of claim 7, wherein said water is an alkaline solution containing a base chosen from the group consisting of the alkali metal hydroxides and the water-soluble amines, and forming the stable dispersion of the acyl-N-methyl ethyl sulfonic acid salt at a pH of at least 7, and in which said salt forming radical is an alkali metal.

9. The process of claim 4, and thereafter withdrawing the reaction product from the acylating zone and mixing the reaction product produced in a mixing zone with water, the quantity of water being sufficient to quench said reaction product, and the ratio of the quantity of water to the quantity of said product, and the temperature of said water and the rate of addition of said product to said water forming a non-gelled pumpable mixture at a temperature below the boiling point of water.

10. The process of claim 9, wherein said water is an alkaline solution containing a base chosen from the group consisting of the alkali metal hydroxides and the water-soluble amines, and forming a stable dispersion of said reaction product at a pH of at least 7, and in which said salt forming radical is an alkali metal.

11. The process of claim 5, and thereafter withdrawing said reaction product from said acylating zone and intimately mixing the reaction product in a mixing zone with water, the quantity of water being sufficient to quench said reaction product, and the ratio of the quantity of water to the quantity of said product, and the temperature of said water and the rate of addition of said product to said water forming a non-gelled pumpable mixture at a temperature below the boiling point of water.

12. The process of claim 11, wherein said water is an alkaline solution containing a base chosen from the group consisting of the alkali metal hydroxides and the water-soluble amines and forming a stable dispersion of said reaction product at a pH of at least 7, and in which said salt forming radical is an alkali metal.

13. The process of claim 12, in which the taurine salt is an alkali metal salt of N-methyl ethyl sulfonic acid.

14. A process comprising heating in an acylating zone, in a mole ratio of at least 1.2 moles of an acylating agent selected from the group consisting of the aliphatic acids and alicyclic carboxylic acids of about 10 to about 18 carbon atoms, to one mole of a taurine salt of the formula

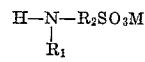

wherein $R_1$ is chosen from the group consisting of hydrogen and a hydrocarbon radical of 1 to about 6 carbon atoms, and $R_2$ is a hydrocarbon radical of 2 to 8 carbon atoms, and M is a salt-forming radical chosen from the group consisting of alkali metals, alkaline earth metals, and water soluble lower alkylamines and lower alkanolamines, in an inert atmosphere at a temperature of about 200° to 320° C., while removing water formed during the reaction and producing an acylated tauride mixed with unreacted acylating agent, and thereafter withdrawing the reaction product from said acylating zone in liquid form and quenching the reaction product by passing it into a quenching bath of water exterior of said acylating zone and intimately mixing the product with the water, the quantity of water being sufficient to quench said reaction product, and the ratio of the quantity of water to the quantity of said product, and the temperature of said water and the rate of addition of said product to said water forming a non-gelled pumpable mixture at a temperature below the boiling point of water.

15. The process of claim 14, wherein the water is an alkaline solution containing a base chosen from the group consisting of the alkali metal hydroxides and the water-soluble amines, and forming a stable fluid dispersion at a pH of at least 7.

References Cited in the file of this patent
UNITED STATES PATENTS 2,857,370    Sundberg _____ Oct. 21, 1955
2,880,219    Burnette et al. _____ Mar. 31, 1959

UNITED STATES PATENT OFFICE
CERTIFICATE OF CORRECTION

Patent No. 3,046,231                                             July 24, 1962

Robert Ernst et al.

It is hereby certified that error appears in the above numbered patent requiring correction and that the said Letters Patent should read as corrected below.

Column 3, line 62, for "$[ClC_6H_5(H)P(O)(OH)]$" read -- $[4\text{-}ClC_6H_4(H)P(O)(OH)]$ --; line 63, for "$[4BrC_6H_4(H)P(O)(OH)]$" read -- $[4\text{-}BrC_6H_4(H)P(O)(OH)]$ --; column 4, line 7, for "Diphenyl $[(C_6H_5)_2P(H)(OH)]$" read -- Diphenyl $[(C_6H_5)_2P(O)(OH)]$ --; column 4, lines 36, 39, 44, 45, 48, 53 and 74 and 75, for "phosphinous", each occurrence, read -- phosphinic --; column 13, line 32, and column 14, lines 33 and 34, for "diphenylphosphinous", each occurrence, read -- diphenylphosphinic --; column 14, line 42, for "phenylphosphinous" read -- phenylphosphinic --; column 16, line 71, for "phosphinous" read -- phosphinic --.

Signed and sealed this 28th day of May 1963.

(SEAL)
Attest:
ERNEST W. SWIDER
Attesting Officer

DAVID L. LADD
Commissioner of Patents